US011858274B2

(12) United States Patent
Osakabe et al.

(10) Patent No.: US 11,858,274 B2
(45) Date of Patent: Jan. 2, 2024

(54) LIQUID CONSUMING APPARATUS INCLUDING LIQUID TANK WITH ROTATABLE COVER

(71) Applicant: BROTHER KOGYO KABUSHIKI KAISHA, Nagoya (JP)

(72) Inventors: Yoshinori Osakabe, Seto (JP); Tomohisa Higuchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/742,805

(22) Filed: May 12, 2022

(65) Prior Publication Data

US 2022/0410582 A1 Dec. 29, 2022

Related U.S. Application Data

(63) Continuation of application No. 17/106,378, filed on Nov. 30, 2020, now Pat. No. 11,331,926, which is a (Continued)

(30) Foreign Application Priority Data

Sep. 30, 2014 (JP) ................................ 2014-200868

(51) Int. Cl.
*B41J 2/175* (2006.01)
*G03G 15/08* (2006.01)
(Continued)

(52) U.S. Cl.
CPC ........... *B41J 2/17553* (2013.01); *B41J 2/175* (2013.01); *B41J 2/1752* (2013.01); (Continued)

(58) Field of Classification Search
CPC .... B41J 2/17553; B41J 2/175; B41J 2/17509; B41J 2/1752; B41J 2/20; G03G 15/0865; (Continued)

(56) References Cited

U.S. PATENT DOCUMENTS

2009/0256884 A1 10/2009 Aoki
2013/0169720 A1 7/2013 Nakamura et al.
(Continued)

FOREIGN PATENT DOCUMENTS

JP 2014-79908 A 5/2014
JP 2014-079909 A 5/2014
(Continued)

OTHER PUBLICATIONS

Office Action (Notice of Reasons for Rejection) issued in related Japanese Patent Application No. 2014-200868, dated Jul. 17, 2018.
(Continued)

*Primary Examiner* — Bradley W Thies
(74) *Attorney, Agent, or Firm* — Merchant & Gould P.C.

(57) ABSTRACT

There is provided a liquid consuming apparatus including: a tank having a liquid storing chamber, an erected wall through which the liquid inside the liquid storage chamber is visible from outside of the tank, and an inlet which is formed to penetrate through the erected wall and via which the liquid is poured into the liquid storage chamber; a liquid consuming section which consumes the liquid stored in the liquid storing chamber; and a cover. A transmitting section and a checking section are formed in an upper surface, of the cover, under a condition that the cover is in the exposure position, the transmitting section configured to transmit information optically to a user of the liquid consuming apparatus and the checking section configured to prevent the liquid moving on a particular surface of the cover from arriving at the transmitting section.

11 Claims, 11 Drawing Sheets

Related U.S. Application Data continuation of application No. 16/447,705, filed on Jun. 20, 2019, now Pat. No. 10,850,528, which is a continuation of application No. 15/816,429, filed on Nov. 17, 2017, now Pat. No. 10,328,708, which is a continuation of application No. 15/290,555, filed on Oct. 11, 2016, now Pat. No. 9,821,563, which is a continuation of application No. 14/854,160, filed on Sep. 15, 2015, now Pat. No. 9,469,117.

(51) Int. Cl.

| | |
|---|---|
| ***B41J 2/20*** | (2006.01) |
| ***G03G 15/10*** | (2006.01) |
| ***G03G 15/00*** | (2006.01) |
| ***G03G 21/16*** | (2006.01) |

(52) U.S. Cl.
CPC ............. *B41J 2/17509* (2013.01); *B41J 2/20* (2013.01); *G03G 15/0865* (2013.01); *G03G 15/0877* (2013.01); *G03G 15/10* (2013.01); *G03G 15/556* (2013.01); *G03G 21/1633* (2013.01)

(58) Field of Classification Search
CPC .. G03G 15/0877; G03G 15/10; G03G 15/556; G03G 21/1633
See application file for complete search history.

(56) References Cited

U.S. PATENT DOCUMENTS

| | | | | |
|---|---|---|---|---|
| 2013/0176367 | A1 | 7/2013 | Kimura | |
| 2014/0104347 | A1* | 4/2014 | Iizawa | B41J 2/17513 347/85 |
| 2014/0104349 | A1 | 4/2014 | Kimura et al. | |

FOREIGN PATENT DOCUMENTS

| | | | |
|---|---|---|---|
| JP | 2014-79933 | A | 5/2014 |
| WO | 2013/085023 | A1 | 4/2015 |

OTHER PUBLICATIONS

Office Action (Notice of Reasons for Rejections) issued in related Japanese Patent Application No. 2018-206332, dated Jul. 9, 2019.

* cited by examiner

LIQUID CONSUMING APPARATUS INCLUDING LIQUID TANK WITH ROTATABLE COVER

CROSS REFERENCE TO RELATED APPLICATION

The present application is a continuation of U.S. patent application Ser. No. 17/106,378, filed Nov. 30, 2020, which is a continuation of U.S. patent application Ser. No. 16/447,705, filed Jun. 20, 2019 (now U.S. Pat. No. 10,850,528), which is a continuation of Ser. No. 15/816,429, filed Nov. 17, 2017 (now U.S. Pat. No. 10,328,708), which is a continuation of U.S. patent application Ser. No. 15/290,555, filed Oct. 11, 2016 (now U.S. Pat. No. 9,821,563), which is a continuation of U.S. patent application Ser. No. 14/854,160, filed Sep. 15, 2015 (now U.S. Pat. No. 9,469,117), all of which further claim priority from Japanese Patent Application No. 2014-200868 filed on Sep. 30, 2014, all of which are incorporated by reference herein in their entirety.

BACKGROUND

Field of the Invention

The present invention relates to a liquid consuming apparatus having a tank which is configured such that a liquid can be replenished or refilled to the tank via an inlet.

Description of the Related Art

Conventionally, there is known a liquid consuming apparatus provided with a tank configured such that a liquid can be replenished to the tank via an inlet, and a liquid consuming section configured to consume the liquid stored in the tank. For example, there is known a recording apparatus configured such that a cover having a visual confirmation window (viewing window) is opened to thereby allow an ink to be charged to an ink storing chamber via an inlet provided on the upper surface of an ink tank.

SUMMARY

In a case that the cover, of the recording apparatus having the above-described configuration, is rotatable about a rotational axis extending in the left-right direction at a position below the ink tank, there is such a possibility that the ink leaked from the inlet might adhere to the cover and thus might lower the visibility of the viewing window. As another example, such a case is also conceivable that the ink adheres to a sticker attached to the cover, which in turn lowers the visibility of any information indicated or written in the sticker.

The present teaching has been made in view of the above-described circumstances; an object of the present teaching is to provide a liquid consuming apparatus capable of suppressing the lowering in visibility of a transmitting section, which is provided on the cover and which is configured to optically transmit information to a user, due to the liquid leaked from the inlet of the tank.

According to an aspect of the present teaching, there is provided a liquid consuming apparatus configured to consume liquid, including:

a tank including a liquid storing chamber configured to store the liquid therein, and an erected wall which is provided upstandingly, which defines an end of the liquid storing chamber in a first direction crossing a vertical direction and through which the liquid inside the liquid storage chamber is visible from outside of the tank, the tank including an inlet which is formed to penetrate through the erected wall;

a liquid consuming section configured to consume the liquid stored in the liquid storing chamber; and a cover configured to rotate between a cover position at which the cover covers the erected wall in the first direction and an exposure position at which the cover allows the erected wall to be exposed, the cover being configured to rotate around an axis extending in a second direction which intersects the vertical direction and the first direction;

wherein the axis of the cover is disposed below the inlet, wherein the cover further comprises a particular surface facing the vertical direction in the exposure position, a transmitting section disposed on the particular surface, the transmitting section being configured to transmit information optically to a user of the liquid consuming apparatus, and a checking section disposed on the particular surface, the checking section being configured to prevent the liquid moving on the particular surface of the cover from arriving at the transmitting section.

According to the above-described configuration, the liquid leaked from the inlet and adhered to the cover can be checked or stopped at the checking section. As a result, it is possible to suppress any lowering in the visibility of the transmitting section which would otherwise be caused by any contamination of the transmitting section with the liquid.

According to another aspect of the present teaching, there is provided a liquid consuming apparatus configured to consume liquid, including:

a tank configured to store the liquid therein, and an erected wall which is provided upstandingly in a vertical direction, the elected wall facing a particular direction, the tank including an inlet which is formed to penetrate through the erected wall; and a cover configured to rotate between a cover position at which the cover covers the erected wall in the particular direction and an exposure position at which the cover allows the erected wall to be exposed, the cover being configured to rotate around an axis extending in a further direction which intersects the vertical direction and the particular direction;

wherein the axis of the cover is disposed below the inlet, wherein the cover further comprises a particular surface facing the vertical direction in the exposure position, the particular surface includes a first area disposed below the tank under the condition the cover is at the cover position, a second area disposed further than the first area in the particular direction under the condition the cover is at the exposure position, and a checking section disposed between the first area and the second area, the checking section being configured to prevent the liquid on the first area of the particular surface from arriving at the second area under the condition the cover is at the exposure position.

BRIEF DESCRIPTION OF THE DRAWINGS

FIGS. 1A, 1B and 1C are external perspective views of a multi-function peripheral 10, wherein FIG. 1A depicts a state that a cover 70 is closed, FIG. 1B depicts a state that the cover 70 is opened, and FIG. 1C is an exploded perspective view of a portion in the vicinity of the rotational axis of the cover 70.

FIGS. 6A and 6B are perspective views of the cover 70, wherein FIG. 6A is a perspective view of the cover 70 as seen from the side of the outer surface of a main wall 72, and FIG. 6B is a perspective view of the cover 70 as seen from the side of the inner surface of the main wall 72.

DESCRIPTION OF THE EMBODIMENTS

An embodiment of the present teaching will be described below. Note that, however, the embodiment described below is merely an example of the present teaching; it goes without saying that it is possible to make any appropriate changes in the embodiment of the present teaching without departing from the gist and scope of the present teaching. Upward and downward are each a component of an up-down direction 7 and are opposite to each other; leftward and rightward are each a component of a left-right direction 9 and are opposite to each other; and frontward and rearward are each a component of a front-rear direction 8 and are opposite to each other. Furthermore, in the embodiment, the up-down direction 7 corresponds to the vertical direction, and each of the front-rear direction 8 and the left-right direction 9 corresponds to the horizontal direction.

Figure 1A:
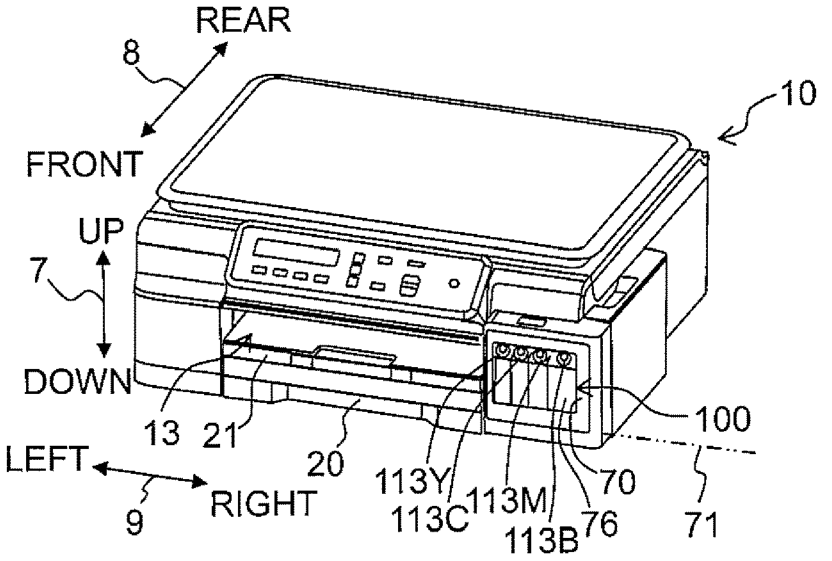
Figure 1B:
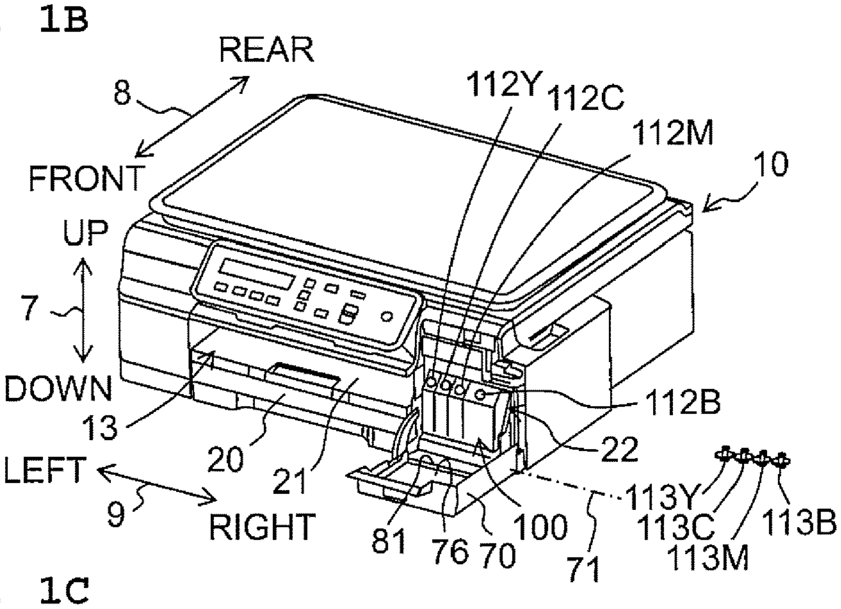
Figure 1C:
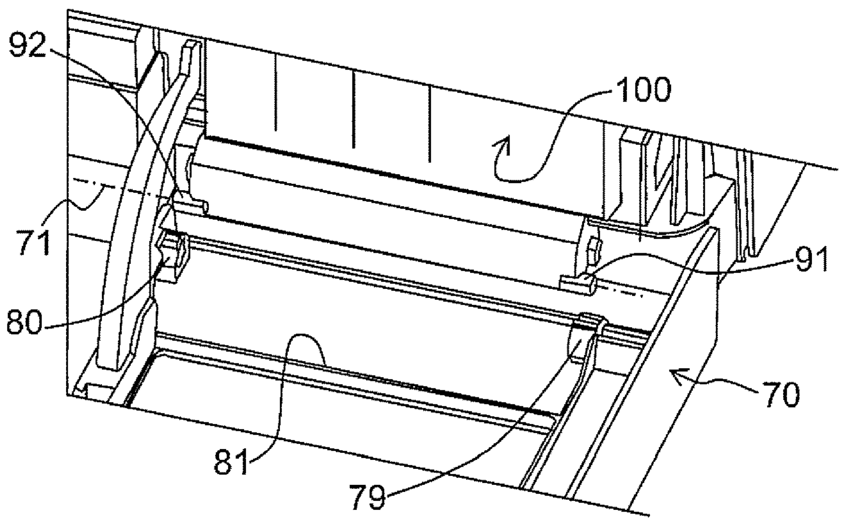

Moreover, the up-down direction 7 is defined with a state that a multi-function peripheral 10 is usably installed or a posture in which the multi-function peripheral 10 is usably installed, as the reference. Note that the state that the multi-function periphery 10 is usably installed as depicted in FIGS. 1A to 1C will be referred to as a "usable state". Moreover, the posture in which the multi-function peripheral 10 is usably installed as depicted in FIGS. 1A to 1C will be referred to as a "usable posture". Further, the front-rear direction 8 is defined such that a side on which an opening 13 of the multi-function peripheral 10 is provided is designated as the front side (front surface), and the left-right direction 9 is defined as viewing the multi-function peripheral 10 from the front side (front surface). The front-rear direction 8 is an example of a first direction, and the left-right direction 9 is an example of a second direction.

<Overall Configuration of Multi-function Peripheral 10>

Figure 2:
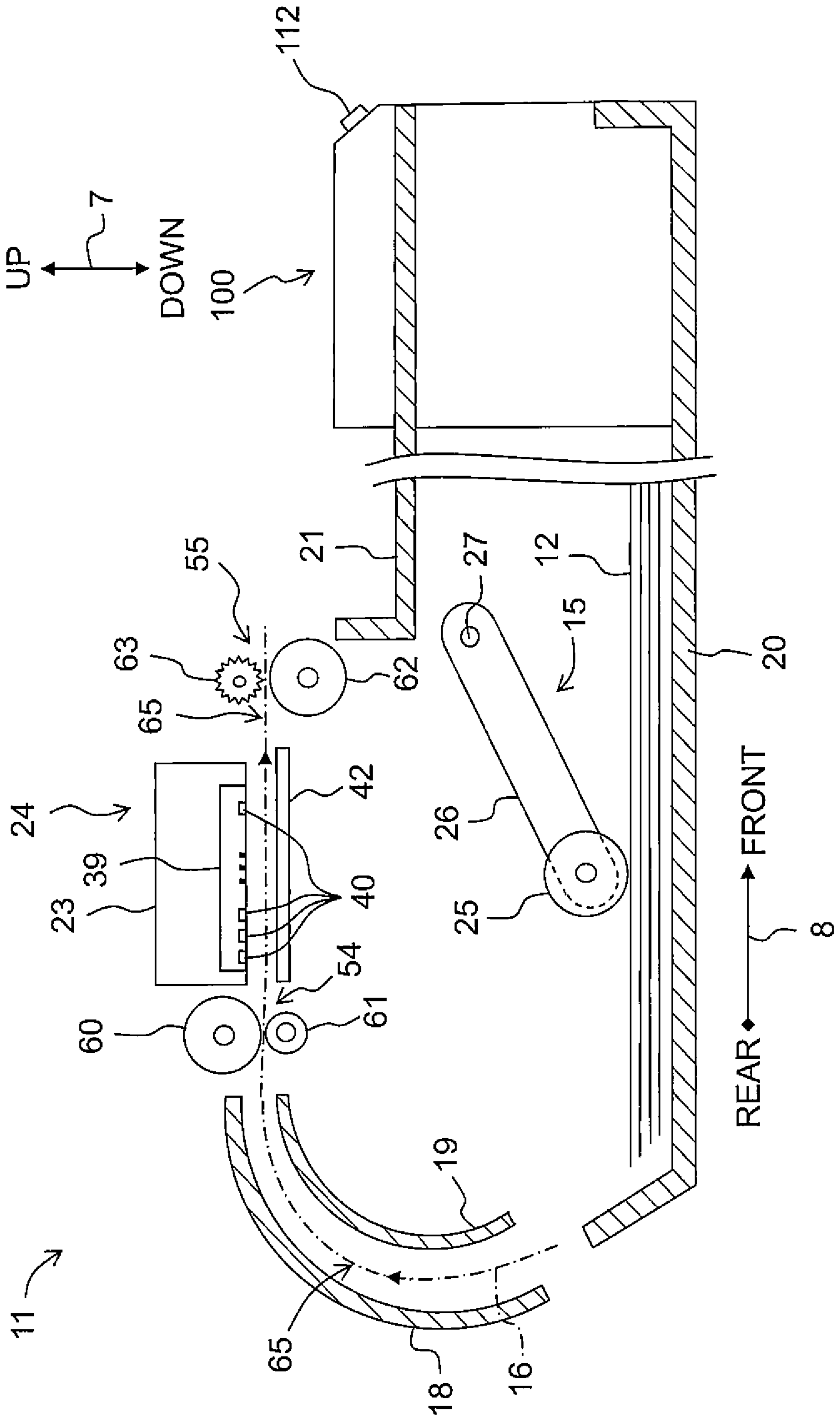
FIG. 2 is a vertical cross-sectional view schematically depicting the internal structure of a printer unit 11.

As depicted in FIGS. 1A and 1B, the multi-function peripheral 10 is formed to have a substantially rectangular parallelepiped shape. The multi-function peripheral 10 includes, at a lower portion of a casing thereof, a printer unit 11 which records an image onto a paper 12 (see FIG. 2) by an ink-jet recording method. As depicted in FIG. 2, the printer unit 11 includes a feeding section 15, a feeding tray 20, a discharge tray 21, a conveyance roller section 54, a recording section 24, a discharge roller section 55, a platen 42, and an ink tank 100 (an example of a tank). Further, the multi-function peripheral 10 has various functions such as a facsimile function and a print function. The multi-function peripheral 10 is an example of a liquid discharging apparatus or a liquid consuming apparatus.

<Feeding Tray 20, Discharge Tray 21>

As depicted in FIGS. 1A and 1B, the feeding tray 20 is inserted into and removed from the multi-function peripheral 10 by a user, in the front-rear direction 8 through the opening 13. The opening 13 is formed in a central portion in the left-right direction 9 of the front surface of the multi-function peripheral 10. The feeding tray 20 is capable of supporting a plurality of sheets of the paper 12 that are stacked in the feeding tray 20. The discharge tray 21 is arranged at the upper side of the feeding tray 20, and is inserted or removed together with the feeding tray 20. The discharge tray 21 supports the paper 12 discharged through a space between the recording section 24 and the platen 42 by the discharge roller section 55.

<Feeding Section 15>

The feeding section 15 feeds the paper 12 supported by the feeding tray 20 to a conveyance route 65. As depicted in FIG. 2, the feeding section 15 includes a feeding roller 25, a feeding arm 26, and a shaft 27. The feeding roller 25 is rotatably supported by the feeding arm 26 at a front end thereof. The feeding roller 25 rotates in a direction for causing the paper 12 to be conveyed in a conveyance direction 16 when a conveyance motor (not depicted in the drawings) is reversely rotated. In the following description, the rotations of the feeding roller 25, a conveyance roller 60, and a discharge roller 62 in the direction for causing the paper 12 to be conveyed in the conveyance direction 16 are each referred to as "normal rotation". The feeding arm 26 is pivotably supported by the shaft 27 supported by the frame of the printer unit 11. A bias is applied to the feeding arm 26 by an elastic force of a spring, etc. or by the self-weight of the feeding arm 26 such that the feeding arm 26 is pivoted and urged toward the feeding tray 20.

<Conveyance Route 65>

Figure 3:
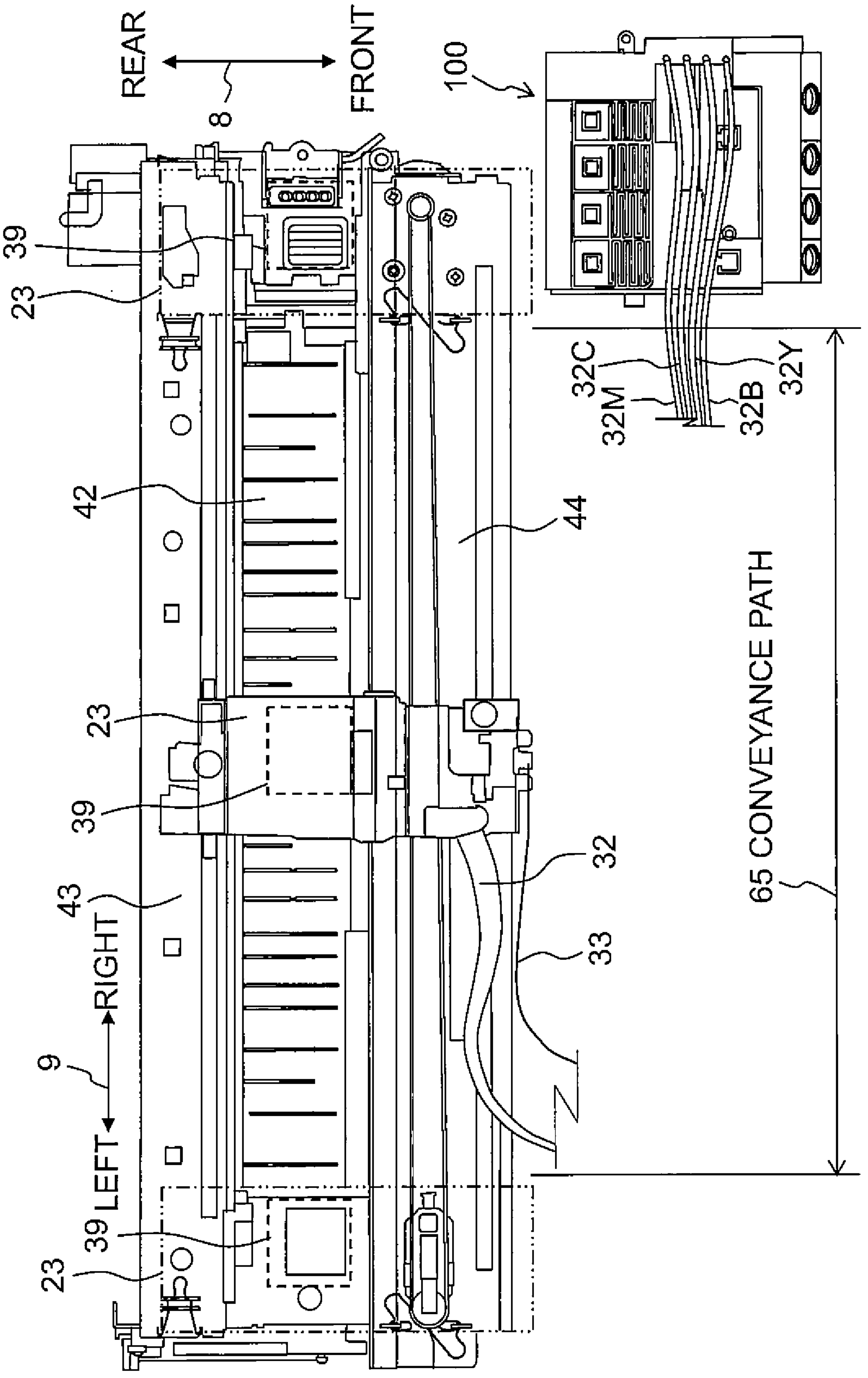
FIG. 3 is a plan view depicting the arrangement of a carriage 23 and an ink tank 100.

As depicted in FIG. 2, in the interior of the printer unit 11, a space is defined by an outer guide member 18 and an inner guide member 19 which are arranged to face with each other with a predetermined gap intervened therebetween. This space constructs a portion of the conveyance route 65. The conveyance route 65 is a route or path that is extended from a rear-end portion of the feeding tray 20 toward the rear side of the printer unit 11. Further, the conveyance route 65 makes a U-turn while being extended from the lower side to the upper side, at the rear side of the printer unit 11; and then the conveyance route 65 reaches the discharge tray 21 via a space between the recording section 24 and the platen 42. As depicted in FIGS. 2 and 3, a portion of the conveyance route 65 between the conveyance roller section 54 and the discharge roller section 55 is provided at a substantially central portion in the left-right direction 9 of the multi-function peripheral 10, and is extended in the front-rear direction 8. Note that in FIG. 2, the conveyance direction 16 of the paper 12 in the conveyance route 65 is indicated by an arrow of a dashed-dotted line.

<Conveyance Roller Section 54>

As depicted in FIG. 2, the conveyance roller section 54 is arranged at the upstream side of the recording section 24 in the conveyance direction 16. The conveyance roller section 54 includes the conveyance roller 60 and a pinch roller 61 which are facing each other. The conveyance roller 60 is driven by a conveyance motor. The pinch roller 61 rotates following the rotation of the conveyance roller 60. The paper 12 is conveyed in the conveyance direction 16 by being pinched between the conveyance roller 60 and the pinch roller 61 which are rotated positively by the normal rotation of the conveyance motor.

<Discharge Roller Section 55>

As depicted in FIG. 2, the discharge roller section 55 is arranged at the downstream side of the recording section 24 in the conveyance direction 16. The discharge roller section 55 includes the discharge roller 62 and a spur 63 which are facing each other. The discharge roller 62 is driven by the conveyance motor. The spur 63 rotates following the rotation of the discharge roller 62. The paper 12 is conveyed in the conveyance direction 16 by being pinched between the discharge roller 62 and the spur 63 which are rotated positively by the normal rotation of the conveyance motor.

<Recording Section 24>

As depicted in FIG. 2, the recording section 24 is arranged between the conveyance roller section 54 and the discharge roller section 55 in the conveyance direction 16. Further, the platen 42 and the recording section 24 are arranged to face each other in the up-down direction 7, while sandwiching the conveyance route 65 therebetween. Namely, the recording section 24 is arranged at a position at which the recording section 24 is located above the conveyance route 65 in the up-down direction 7 and at which the recording section 24 faces the conveyance route 65. The recording section 24 includes a carriage 23 and a recording head 39 (an example of a head or a liquid consuming section).

As depicted in FIG. 3, the carriage 23 is supported by guide rails 43 and 44 which are extended in the left-right direction 9, respectively at positions separated in the front-rear direction 8. The guide rails 43 and 44 are supported by the frame of the printer unit 11. The carriage 23 is connected to a known belt mechanism disposed on the guide rail 44. The belt mechanism is driven by a carriage motor (not depicted in the drawings). Namely, the carriage 23 connected to the belt mechanism reciprocates in the left-right direction 9 by being driven by the carriage motor. As depicted by alternate long and short dash lines in FIG. 3, the range of movement of the carriage 23 spans beyond the left and right end sides of the conveyance route 65 in the left-right direction 9.

Further, an ink tube 32 which connects the ink tank 100 and the recording head 39 and a flexible flat cable 33 which electrically connects the recording head 39 and a control circuit board having a controller (not depicted in the drawings) mounted thereon are extended from the carriage 23. The ink tube 32 supplies an ink stored in the ink tank 100 to the recording head 39. More specifically, four ink tubes 32B, 32M, 32C, and 32Y via which inks of respective colors (which are black, magenta, cyan, and yellow colors) are distributed are extended from the ink tank 100, and are connected to the carriage 23 in a bundled form. In the following description, these four ink tubes 32B, 32M, 32C, and 32Y will be collectively referred to as "ink tube(s) 32" in some cases. The flexible flat cable 33 transmits a control signal output from the controller to the recording head 39.

As depicted in FIG. 2, the recording head 39 is installed on the carriage 23. A plurality of nozzles 40 is formed in the lower surface of the recording head 39. End portions (tip portions) of the nozzles 40 are exposed from the lower surface of the recording head 39 and from the lower surface of the carriage 23 on which the recording head 39 is installed. In the following description, the surface through which the end portions of the nozzles 40 are exposed will be referred to as a "nozzle surface" in some cases. The recording head 39 jets or discharges the ink as fine ink droplets (minute ink droplets) through the nozzles 40. In a process of movement of the carriage 23, the recording head 39 jets the ink droplets toward the paper 12 supported by the platen 42. Accordingly, an image, etc. is recorded on the paper 12.

<Platen 42>

As depicted in FIGS. 2 and 3, the platen 42 is arranged between the conveyance roller section 54 and the discharge roller section 55 in the conveyance direction 16. The platen 42 is arranged so as to face the recording section 24 in the up-down direction 7, and supports the paper 12, conveyed by the conveyance roller section 54, from therebelow.

<Ink Tank 100>

As depicted in FIGS. 1A to 1C, the ink tank 100 is accommodated inside the multi-function peripheral 10. The ink tank 100 is fixed to the multi-function peripheral 10 such that the ink tank 100 cannot be easily removed from the multi-function peripheral 10. More specifically, the ink tank 100 is accommodated in the inside of the multi-function peripheral 10 via an opening 22 formed in the front surface of the casing of the multi-function peripheral 10, at the right end of the front surface in the left-right direction 9. The opening 22 is adjacent to the opening 13 in the left-right direction 9. Note that, however, the front surface (a portion of a base wall 101A and a portion of an inclined wall 101B which will be described later on) of the ink tank 100 is located in front of the opening 22 in the front-rear direction 8 (more specifically, located in front of a portion of the front wall of the casing defining the opening 22).

Further, the multi-function peripheral 10 is provided with a box-shaped cover 70 capable of covering the front surface, of the ink tank 100, located in front of the opening 22. The cover 70 is supported by the casing of the multi-function peripheral 10 to be rotatable between a cover position at which the cover 70 covers the opening 22 and a front wall 101 of the ink tank 100 (see FIG. 1A), and an exposure position at which the cover 70 allows the opening 22 and the front wall 101 of the ink tank 100 to be exposed to the outside of the multi-function peripheral 10 at which the cover 70 does not cover the opening 22 and the front wall 101 of the ink tank 100 (see FIG. 1B). The upper surface of the cover 70 in the cover position is substantially horizontal. Note that, alternatively, the upper surface of the cover 70 at the cover position may be inclined obliquely downward from the side of the rotational base end of the cover 70 toward the rotational distal end of the cover 70.

As depicted in FIGS. 1A, 1B, 7 and 8, the cover 70 in this embodiment is supported by the casing of the multi-function peripheral 10 to be rotatable about a rotational axis 71 extended in the left-right direction 9 at a lower end portion in the up-down direction 7. The rotational axis 71 in this embodiment is located in front of the front wall 101 in the front-rear direction 8 (namely, is located on the side opposite to an ink chamber 111 (to be described later on) with respect to the front wall 101), and below the ink tank 100 in the up-down direction 7. Note that, however, it is sufficient that the position of the rotational axis 71 is at least below an inlet 112 (to be described later on), and further that the ink tank 100 and the rotational axis 71 have the above-described positional relationship under a condition that the ink tank 100 is in an inflow posture at which the liquid can be poured into the ink tank 100.

Figure 4:
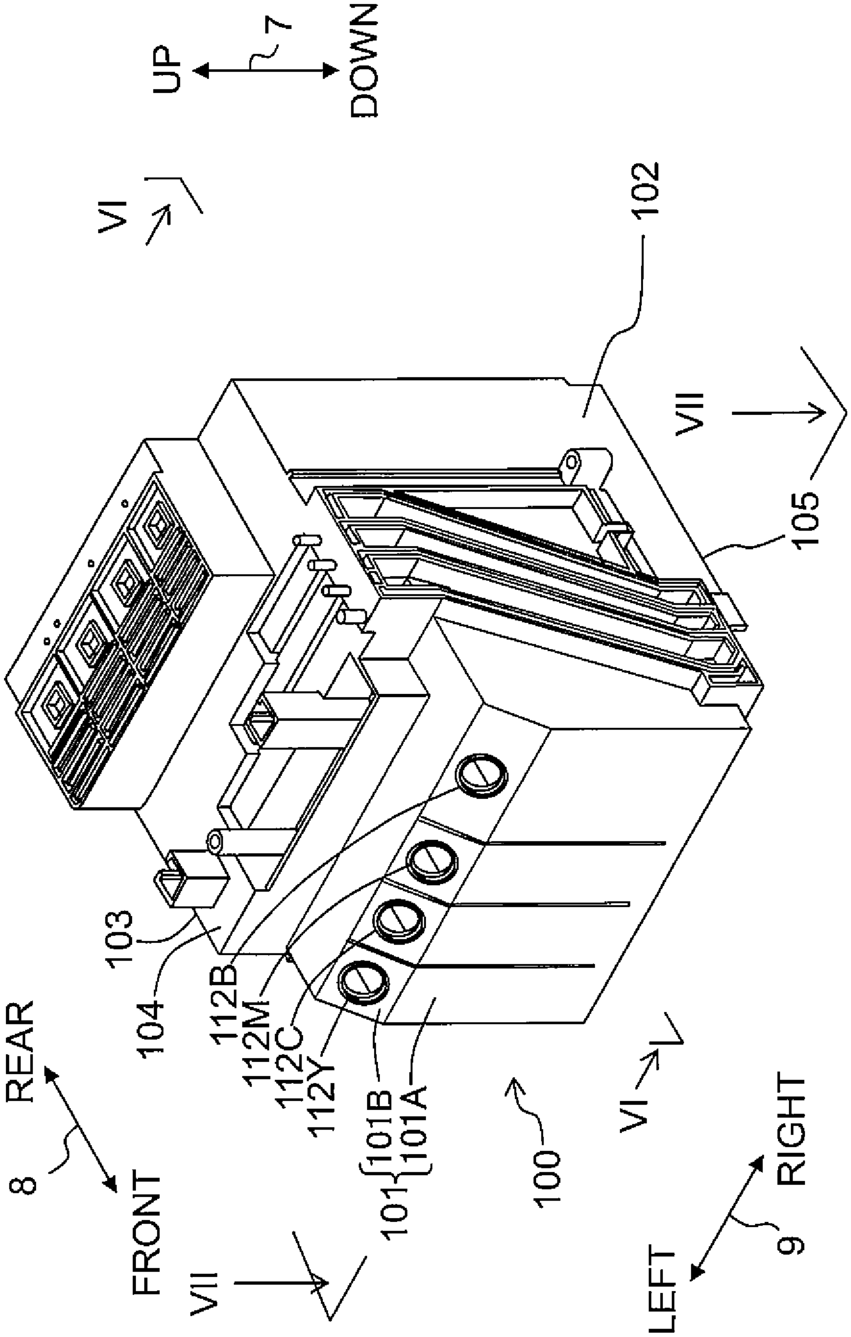
FIG. 4 is a front perspective view of the ink tank 100.
Figure 5:
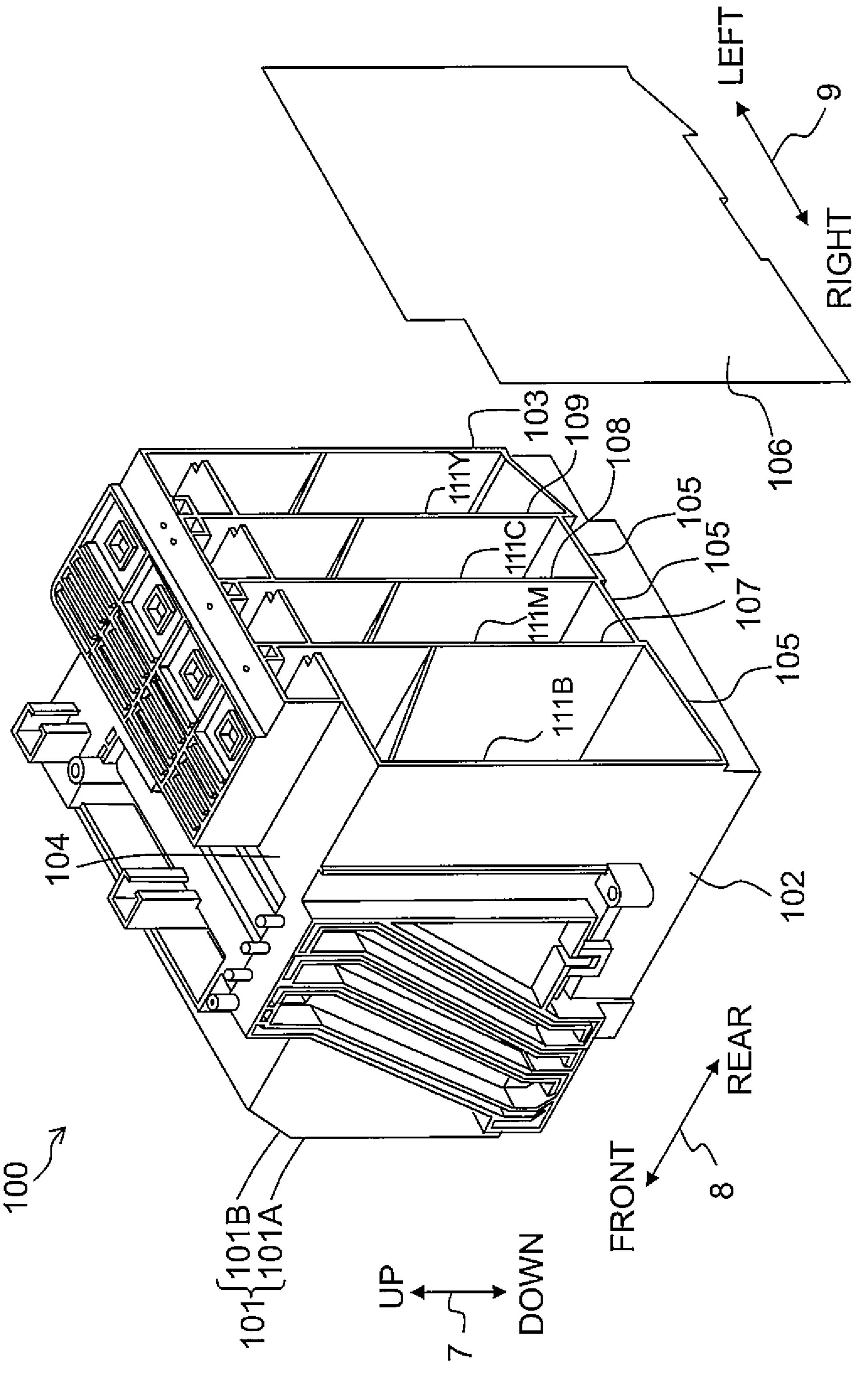
FIG. 5 is a rear perspective view of the ink tank 100.

As depicted in FIGS. 4 and 5, the ink tank 100 has an outer shape that is substantially rectangular parallelepiped. The ink tank 100 has a front wall 101, a right wall 102, a left wall 103, an upper wall 104, and a lower wall 105. On the other hand, the rear surface of the ink tank 100 is opened or uncovered. Further, by fixing a film 106 by welding to rear-end surfaces of the right wall 102, the left wall 103, the upper wall 104 and the lower wall 105, the rear surface of the ink tank 100 is sealed. Namely, the film 106 forms the rear wall of the ink tank 100. The ink tank 100 having the above-described configuration is molded or shaped as an integrated part or component by, for example, performing injection-molding with a resin material. For example, the inner shape or profile of the ink tank 100 (to be described later on) is defined by an unillustrated mold (metal mold) which is pulled out in the rearward direction from the uncovered rear surface of the ink tank 100.

The upper wall 104 defines or demarcates the upper end of the ink chamber 111 in the up-down direction 7. The lower wall 105 defines the lower end of the ink chamber 111 in the up-down direction 7. The front wall 101, the right wall 102 and the left wall 103 each as an example of the erected wall are provided upstandingly between the upper wall 104 and the lower wall 105 in a direction crossing the upper and lower walls 104 and 105. Further, each of the walls 101 to 105 has at least light transmitting property or translucency to such an extent that the ink inside the ink chamber 111 is visually observable or recognizable from the outside of the ink tank 100.

The front wall 101 is constructed of a base wall 101A extending from the lower wall 105 substantially in the up-down direction 7 and an inclined wall 101B which is connected or continued to the upper end of the base wall 101A and which is inclined relative to the up-down direction 7 and the front-rear direction 8. The inclined wall 101B is formed with an inlet 112 penetrating through the inclined wall 101B in the thickness direction thereof. The inclined wall 101B is inclined rearward relative to the base wall 101A (namely, inclined toward the ink chamber 111).

<Ink Chamber 111>

As depicted in FIG. 5, a plurality of partition walls 107, 108 and 109 which define or demarcate the internal space of the ink tank 100 is provided in the interior of the ink tank 100. Each of the partition walls 107, 108 and 109 is extended in the up-down direction 7 and the front-rear direction 8, and is connected to the front wall 101, the upper wall 104, the lower wall 105 and the film 106. Further, the partition walls 107, 108 and 109 are disposed to be separated and away from one another in the left-right direction 9. As a result, the internal space of the ink tank 100 is partitioned into four ink chambers 111B, 111M, 111C and 111Y that are adjacent in the left-right direction 9. The ink chambers 111B, 111M, 111C and 111Y are each an example of a liquid storage chamber for storing ink to be jetted through the nozzles 40.

The ink chamber 111B is a space demarcated by the front wall 101, the right wall 102, the upper wall 104, the lower wall 105, the film 106 and the partition wall 107. The ink chamber 111M is a space demarcated by the front wall 101, the upper wall 104, the lower wall 105, the film 106 and the partition walls 107 and 108. The ink chamber 111C is a space demarcated by the front wall 101, the upper wall 104, the lower wall 105, the film 106 and the partition walls 108 and 109. The ink chamber 111Y is a space demarcated by the front wall 101, the left wall 103, the upper wall 104, the lower wall 105, the film 106 and the partition wall 109.

In the following description, the ink chambers 111B, 111M, 111C, and 111Y are collectively referred to as "ink chamber(s) 111" in some cases. Further, reference numerals having different alphabetic suffixes (B, M, C, and Y) are assigned to four components provided while corresponding to the ink chambers 111B, 111M, 111C and 111Y, respectively; in a case that these components are collectively referred to, then these components are assigned with a reference numeral(s) while omitting the respective alphabetic suffixes, in some cases.

Inks of different colors are stored in the ink chambers 111, respectively. Specifically, black ink is stored in the ink chamber 111B, cyan ink is stored in the ink chamber 111C, magenta ink is stored in the ink chamber 111M, and yellow ink is stored in the ink chamber 111Y. Each of the color inks is an example of a liquid. However, the number of ink chambers 111 and the colors of the inks are not restricted to the number and the colors in the above-described example. The ink chambers 111 are arranged along the left-right direction 9. Further, among the four ink chambers 111B, 111M, 111C and 111Y, the ink chamber 111B is arranged at the rightmost side and the ink chamber 111Y is arranged at the leftmost side. Namely, the ink chambers 111B, 111M1 111C and 111Y are arranged such that the ink chamber 111B storing the black ink is located to be most separated away from the ink chamber 111Y storing the yellow ink. Furthermore, the ink chamber 111B has a volume larger than the any other ink chambers 111M, 111C and 111Y.

<Inlet 112>

The inclined wall 101B of the ink tank 100 is provided with inlets 112B, 112M, 112C, and 112Y (hereinafter, collectively referred to as "inlet(s) 112") via which the inks are allowed to flow into the ink chambers 111, respectively. The inlet 112 penetrates through the inclined wall 101B in a direction of the thickness of the inclined wall 101B, and makes the corresponding ink chamber 111 communicate with the outside of the ink tank 100. The inner surface of the inclined wall 101B faces the ink chamber 111, and the outer surface of the inclined wall 101B faces the outside of the ink tank 100. The inclined wall 101B is inclined such that the outer surface thereof is located at a position above the inner surface of the inclined wall 101B. Consequently, the inlet 112 allows the ink chamber 111 and the outside of the ink tank 100 to directly communicate with each other. Namely, between the inlet 112 and the ink chamber 111, there is no channel which is bent or curved and which has a cross-sectional area smaller than the cross-sectional area of the inlet 112. Further, it is allowable that the inlet 112 is formed in the upper wall 104, rather than in the inclined wall 101B.

The inclined wall 101B and the inlet 112 provided on the inclined wall 101B are exposed to the outside of the multi-function peripheral 10 by locating the cover 70 at the exposure position under a condition that the cover 70 is located at the exposure position as depicted in FIG. 1B. Further, the inlet 112 is provided on the inclined wall 101B to be in front of the opening 22. In the present embodiment, the posture of the ink tank 100 at which the ink can be flowed into the ink chamber 111 through the inlet 112 (inflow posture) coincides with the posture of the ink tank 100 when the multi-function peripheral 10 is in the usable state. Namely, when the multi-function peripheral 10 is in the usable state, the ink is poured into the ink chamber 111 through the inlet 112. Although the inlet 112 in this embodiment is circular-shaped, the shape of the inlet 112 is not limited to this; the inlet 112 may be oval-shaped, polygonal-shaped, etc.

The ink tank 100 has caps 113B, 113M, 113C and 113Y (hereinafter collectively referred to as "cap(s) 113" in some cases) that are detachably attached with respect to the inlets 112. As depicted in FIG. 1A, the cap 113 attached to the inlet 112 blocks or closes the inlet 112 by making a tight contact with the periphery of the inlet 112. On the other hand, as depicted in FIG. 1B, in a case that the cap 113 is removed from the inlet 112, the inlet 112 is open or released. The cap

113 is attached to and removed from the inlet 112 in a state that the cover 70 is located at the exposure position. Further, by removing the cap 113 from the inlet 112, the ink can be poured into the ink chamber 111 via the inlet 112.

Note that an ink outflow channel (not depicted in the drawings) is provided in each of the ink chambers 111B, 111M, 113C and 113Y. The ink outflow channel is a channel that allows the ink stored in the corresponding ink chamber 111 to flow out of the ink tank 100. An end of the ink outflow channel is connected to the ink chamber 111 corresponding thereto; the other end of the ink outflow channel is connected to the ink tube 32 corresponding thereto. With this, the ink stored in each of the ink chambers 111 is supplied to the recording head 39 via one of the ink outflow channels and one of the ink tubes 32 which correspond to the ink chamber 111.

Further, atmosphere communicating holes (not depicted in the drawings) are provided on the ink chambers 111B, 111M, 111C and 111Y, respectively. The atmosphere communicating hole allows the ink chamber corresponding thereto to communicate with the atmosphere. With this, the internal pressure in each of the ink chambers 111 is maintained at the atmospheric pressure. As a result, any excessive supply of the ink due to the increase in inner pressure in the ink chamber 111 or any backflow of the ink due to the decrease in inner pressure in the ink chamber 111, etc. are suppressed. Further, the atmosphere communicating hole is provided with a semipermeable membrane, etc. configured to suppress any leaking of the ink.

<Cover 70>

Figure 6B:
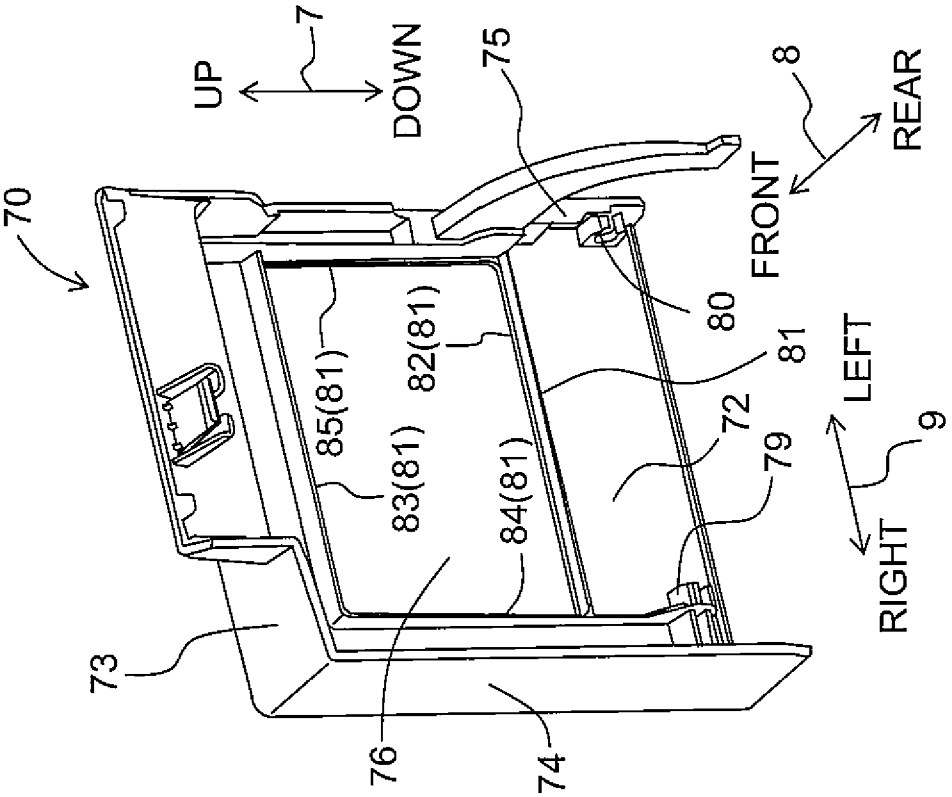
Figure 6A:
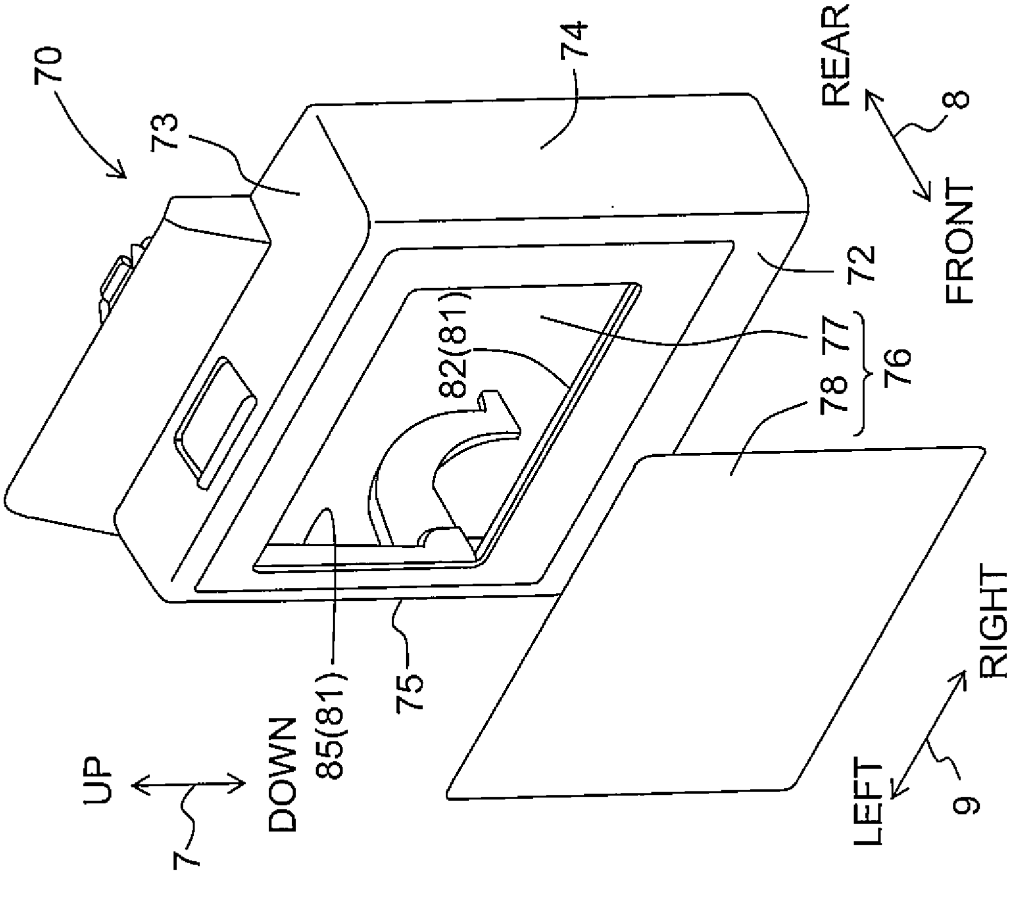

As depicted in FIG. 6, the cover 70 is a box-shaped member having a main wall 72 having a substantially rectangular-shape and side walls 73, 74 and 75 projecting from the outer periphery of the main wall 72 in the thickness direction of the main wall 72. The side wall 73 is disposed on the cover 70 at the rotational distal end thereof, so as to extend along the outer periphery of the main wall 72. The side wall 74 is disposed to extend along the outer periphery of the main wall 72 from an end portion, of the side wall 73, at one side in the left-right direction 9. The side wall 75 is disposed to extend along the outer periphery of the main wall 72 from an end portion, of the side wall 73, at the other side in the left-right direction 9. Namely, the side walls 74 and 75 are arranged to face each other in the left-right direction 9. The outer surface of the cover 70 (in other words, the outer surfaces of the main wall 72 and of the side walls 73 to 75) are continued to the outer surface of the multi-function peripheral 10. Namely, the outer surface of the cover 70 constructs a portion of the outer surface of the multi-function peripheral 10.

Further, the cover 70 is provided with a transparent window 76. The transparent window 76 allows the front wall 101, of the ink tank 100, to be visually observable from the outside of the multi-function peripheral 10 in a state that the cover 70 is located at the cover position. The transparent window 76 is an example of the transmitting section configured to optically transmit information to a user of the multi-function peripheral 10.

In this embodiment, the term "information to be optically transferred" means the position of the liquid surface (liquid level) of the ink which can be visually observed through the front wall 101. Namely, the transmitting section in the embodiment is configured such that the transmitting section itself does not possess any information to be transmitted, but allows an object (the front wall 101 in the embodiment) having the information to be transmitted to be visually observable from the outside.

The transparent window 76 has an opening 77 having a substantially rectangular shape and penetrating through the main wall 72 in the thickness direction thereof, and a film 78 closing the opening 77. The film 78 is formed of a light-transmitting or translucent material. The film 78 in this embodiment is adhered to the periphery of the opening 77, on the side of the outer surface of the main wall 72 (namely, the surface of the cover 70 on the opposite side to the inner surface thereof which faces the front wall 101).

Further, the side walls 74 and 75 are provided with bearings 79 and 80, respectively. The bearings 79 and 80 are arranged on the rotational axis 71 in a state that the cover 70 is attached to the casing. Furthermore, as depicted in FIG. 1C, a portion, of the casing, which demarcates the lower portion of the opening 22 is provided with a pair of spindles 91 and 92 projected in mutually separating directions on the rotational axis 71. In the state that the cover 70 is attached to the casing, the bearings 79 and 80 receive the spindles 91 and 92, respectively. With this, the cover 70 is made to be rotatable around the rotational axis 71 with respect to the casing.

Moreover, as depicted in FIG. 6, a rib 81 is provided on the inner surface of the main wall 72 at a position surrounding the periphery of the opening 77. The rib 81 is formed to project from the inner surface of the main wall 72 and to extend along the periphery of the opening 77. The term "inner surface of the main wall 72" means a surface on a side facing the ink tank 100 under a condition that the cover 70 is located at the cover position. In other words, the inner surface of the main wall 72 means the upper surface, of the main wall 72, under a condition that the cover 70 is located at the exposure positon. Further, the rib 81 is an example of the checking section configured to prevent the ink moving on the upper surface of the cover 70, under the condition that the cover 70 is located at the exposure positon, from arriving at the transparent window 76.

The rib 81 is constructed of a first rib 82 arranged on the rotational base end side of the cover 70, a second rib 83 arranged on the rotational distal end side of the cover 70, a third rib 84 arranged on the side of the side wall 74, and a fourth rib 85 arranged on the side of the side wall 75. The end portions of the first and second ribs 82 and 83 are connected to the end portions of the third and fourth ribs 84 and 85. The first and second ribs 82 and 83 are formed to extend in the left-right direction 9 (an example of the extending direction). The third and fourth ribs 84 and 85 are formed to extend in the up-down direction 7 (another direction of the extending direction) under the condition that the cover 70 is located at the cover position, and are formed to extend in the front-rear direction 8 (yet another direction of the extending direction) under the condition that the cover 70 is located at the exposure position.

Figure 7:
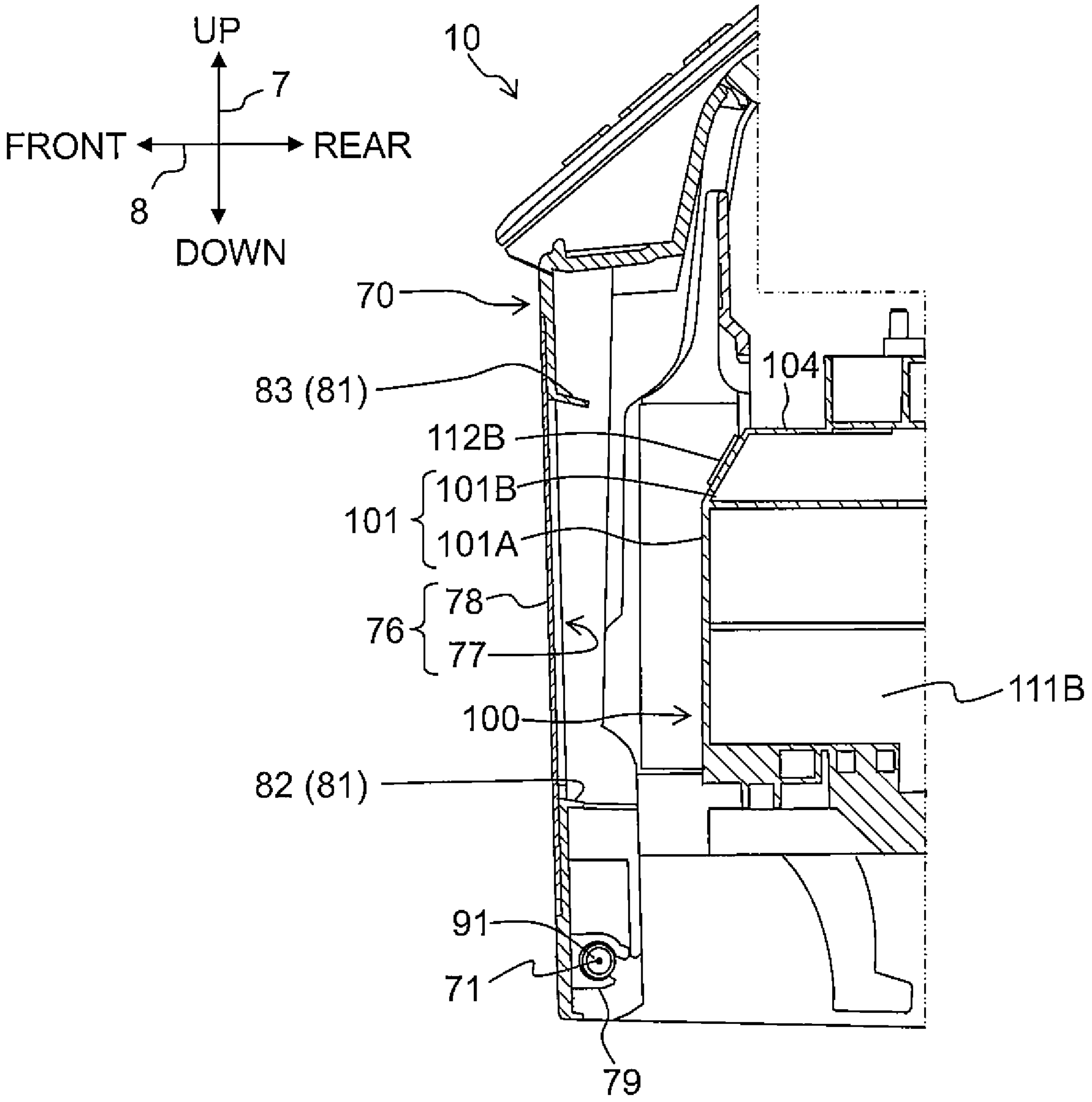
FIG. 7 is a vertical cross-sectional view of the cover 70 at a cover position and of the ink tank 100.
Figure 8:
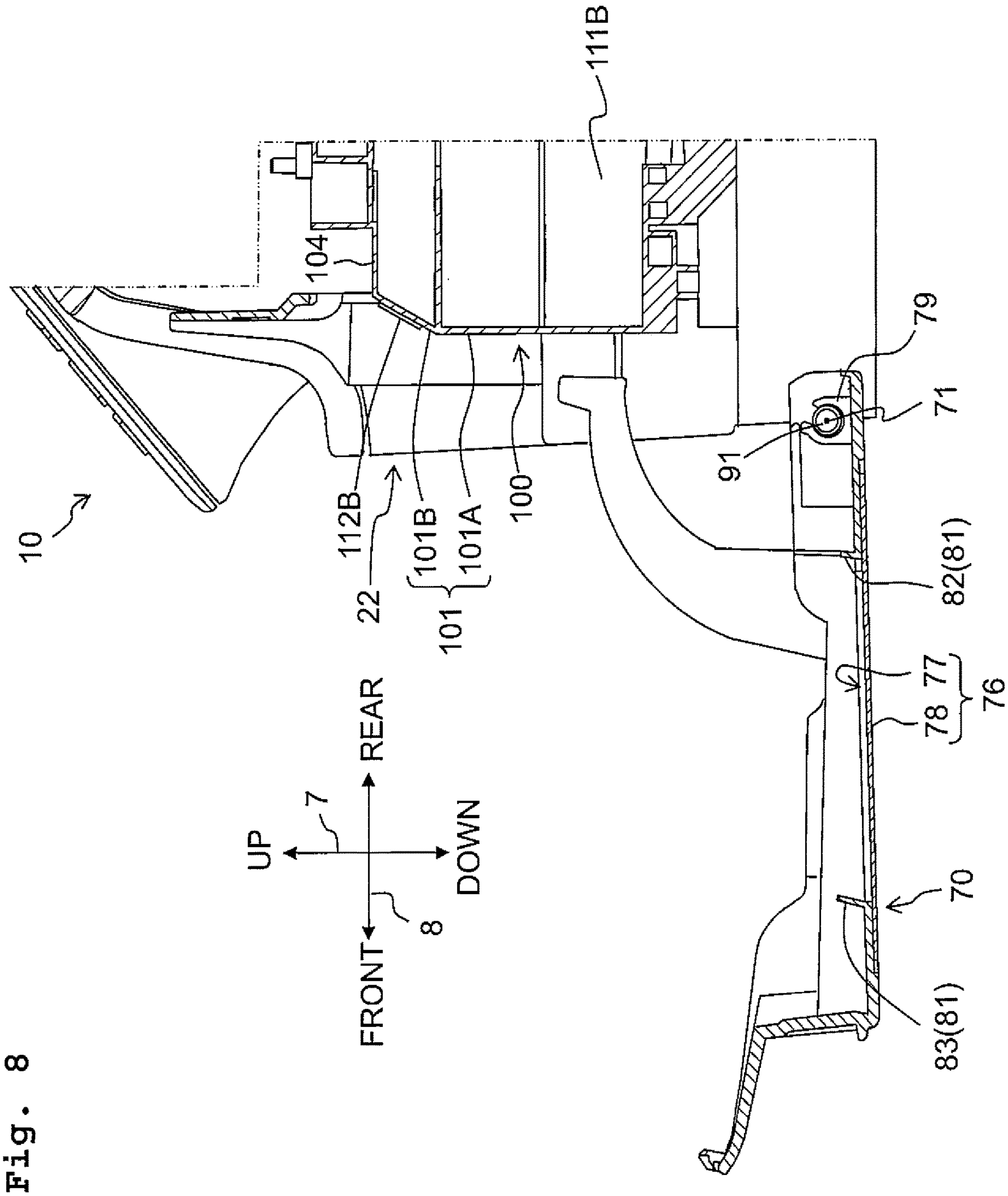
FIG. 8 is a vertical cross-sectional view of the cover 70 at an exposure position and of the ink tank 100.

The first to fourth ribs 82 to 85 project rearward from the inner surface of the main wall 72 under the condition that the cover 70 is located at the cover position (for example, see FIGS. 7 and 8). Accordingly, a projection amount at which the first to fourth ribs 82 to 85 project is set to such a range that the first to fourth ribs 82 to 85 do not make contact with the front wall 101 of the ink tank 100 under the condition that the cover 70 is located at the cover position. Further, as depicted in FIG. 8, the first to fourth ribs 82 to 85 project upward from the inner surface of the main wall 72 under the condition that the cover 70 is located at the exposure position. Note that the first rib 82 is formed to extend substantially vertically with respect to the main wall 72. On the other hand, the second rib 83 is inclined with respect to the main wall 72. In such a manner, the angle of the rib 81 with respect to the main wall 72 is not particularly limited. Further, the thickness of the first rib 82 is gradually thinned (namely, is tapered) from the projection base end side toward the projection distal end side. On the other hand, the thickness of the second rib 83 is substantially same or uniform in the projection direction. In such a manner, the thickness of the rib 81 in the projection direction is not particularly limited.

In the multi-function periphery 10 of the embodiment as described above, in a case that a user attempts to replenish or recharge the ink to the ink tank 100, the user causes the cover 70 to rotate to the exposure position, removes the cap 113 from the inlet 112, and pours the ink from the released inlet 112. In this situation, the ink not poured into the inlet 112 or the ink overflowed from the inlet 112 moves on the front wall 101 and flows downward, and adheres to the inner surface (upper surface) of the cover 70 in the inflow posture. However, according to the above-described embodiment, the ink adhered to the inner surface of the cover 70 is checked or stopped by the rib 81 and is guided to the extending direction of the rib 81. As a result, it is possible to suppress the lowering in visibility of the front wall 101 due to the contamination of the transparent window 76 with the ink.

Note that in the embodiment, the explanation has been given, by way of example, about the rib 81 having the first to fourth ribs 82 to 85 surrounding the periphery of the transparent window 76. With this, it is possible to effectively suppress the adhesion of the ink to the transparent window 76. Further, the rib 81 functions also as a reinforcing section configured to reinforce the rigidity, of the cover 70, lowered due to the provision of the opening 77. As a result, it is possible to suppress any twisting of the cover 70 when the cover 70 is pivoted or rotated. The arrangement of the rib 81, however, is not limited to this. For example, it is sufficient that only the first rib 82 is disposed, such that the first rib 82 is located between the front wall 101 and the transparent window 76 in the front-rear direction 8 in the state that the cover 70 is at the exposure position. With this, it is possible to cut off any route via which the liquid mainly moves or flows on the cover 70. Further, it is allowable to omit the second rib 83 located at the farthest from the ink tank 100 under the condition that the cover 70 is located at the exposure position, and to construct the rib 81 with the first rib 82, the third rib 84 and the fourth rib 85.

Figure 10:
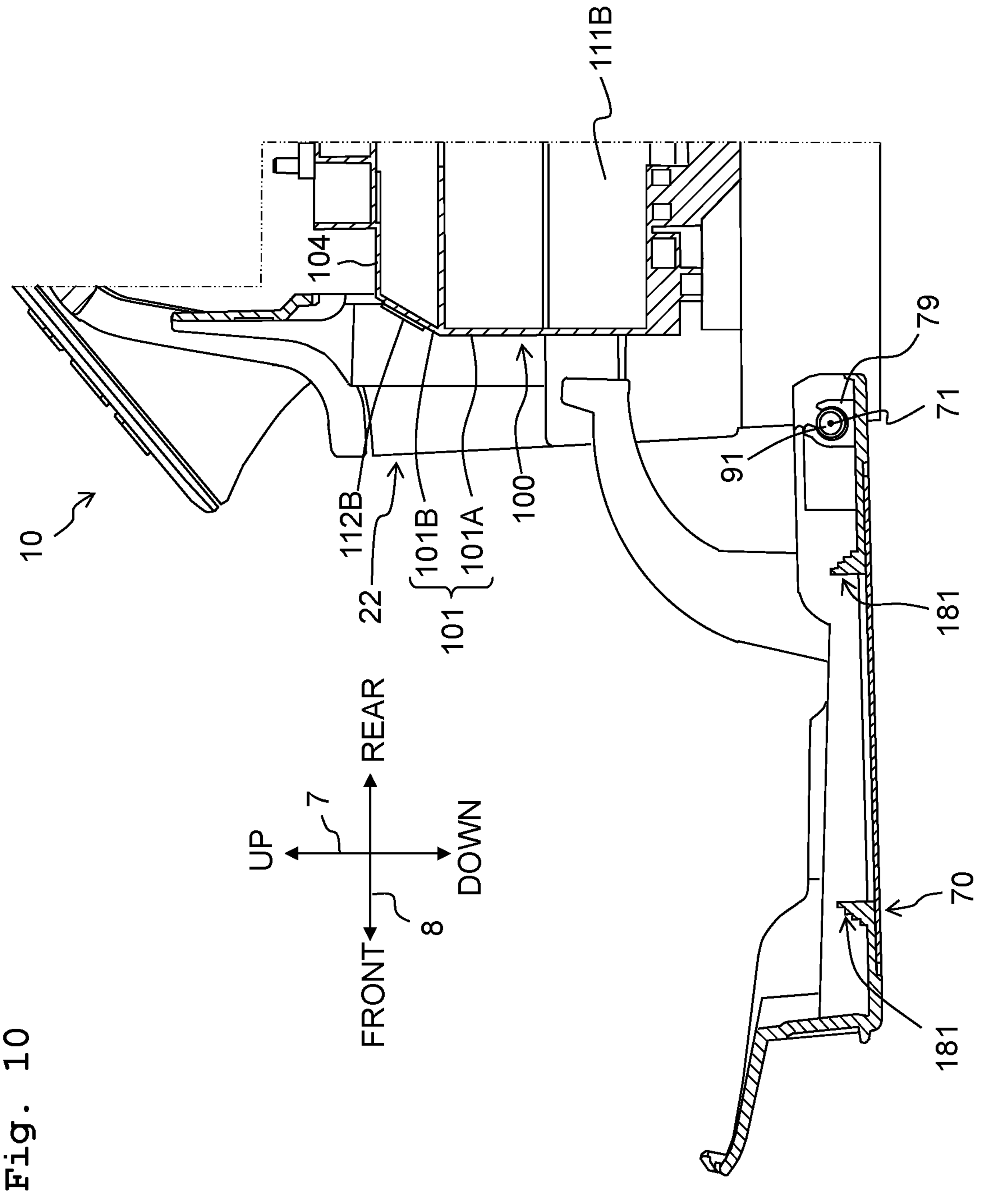
FIG. 10 is a vertical cross-sectional view of an alternative embodiment the cover 70 at an exposure position and of the ink tank 100.
Figure 11:
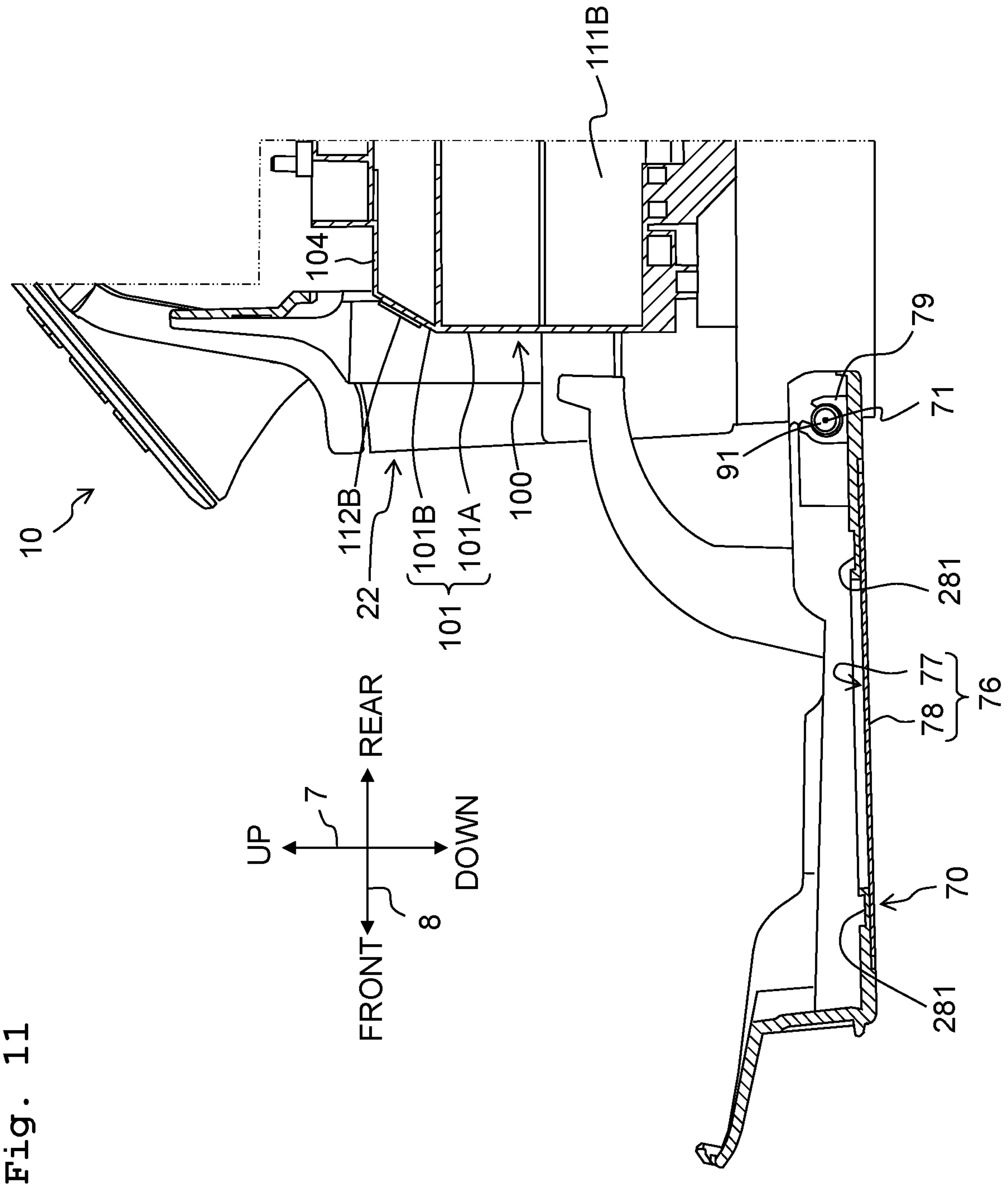
FIG. 11 is a vertical cross-sectional view of another alternative embodiment the cover 70 at an exposure position and of the ink tank 100.

Further, in the embodiment, the explanation has been made regarding the rib 81 as an example of the checking section. However, the specific example of the checking section is not limited to this. For example, it is allowable to provide a groove, a stepped portion, etc. in the inner surface of the main wall 72, instead of providing the rib 81. FIG. 11 illustrates an example groove 281, where the groove 281 is realized by recessing the inner surface of the main wall 72, or the groove 281 may be formed between a pair of ribs provided upstandingly and parallel to each other in the inner surface of the main wall 72. The stepped portion may be such a stepped portion 181 as shown in FIG. 10, in which that a side thereof closer to the transparent window 76 is greater in height. Furthermore, the checking section may be configured by a combination of the rib, groove and stepped portion, etc.

Moreover, an ink absorbing member configured to absorb the ink may be arranged around the checking section. The ink absorbing member may be formed of a porous material such as foamed polyurethane. In a case that the checking section is the rib 81 or the stepped portion, the ink absorbing member may be arranged along the rib 81 or the stepped portion. Further, in a case that the checking section is the groove, the ink absorbing member may be filled inside the groove. With this, it is possible to further effectively check and stop the ink moving toward the transparent window 76.

Furthermore, it is allowable that the checking section may be configured to hold the ink by, for example, surface tension. With this, it is possible to effectively prevent the ink from arriving at the transparent window 76. Note that the specific shape of the checking section for holding the ink by the surface tension is appropriately selected depending on the kind of the ink (mainly the viscosity of the ink), the wettability of the surface of the cover 70, etc.

Moreover, the checking section may be configured to guide the ink in the left-right direction 9 by, for example, the capillarity. With this, it is possible to reduce the amount of the ink which might flow across the checking section, thereby making it possible to effectively prevent the ink from arriving at the transparent window 76. Note that the specific shape of the checking section for causing the capillarity is appropriately selected depending on the kind of the liquid (mainly the viscosity of the liquid), the wettability of the surface of the cover 70, etc. The checking section configured to cause the capillarity is preferably realized by a groove.

Further, although the ink tank 100 according to the embodiment has the four ink chambers 111B, 111M, 111C and 111Y which store the four color inks, respectively, the specific configuration of the ink tank 100 is not limited to this. For example, the ink tank may be configured to store only the black ink.

Figure 9:
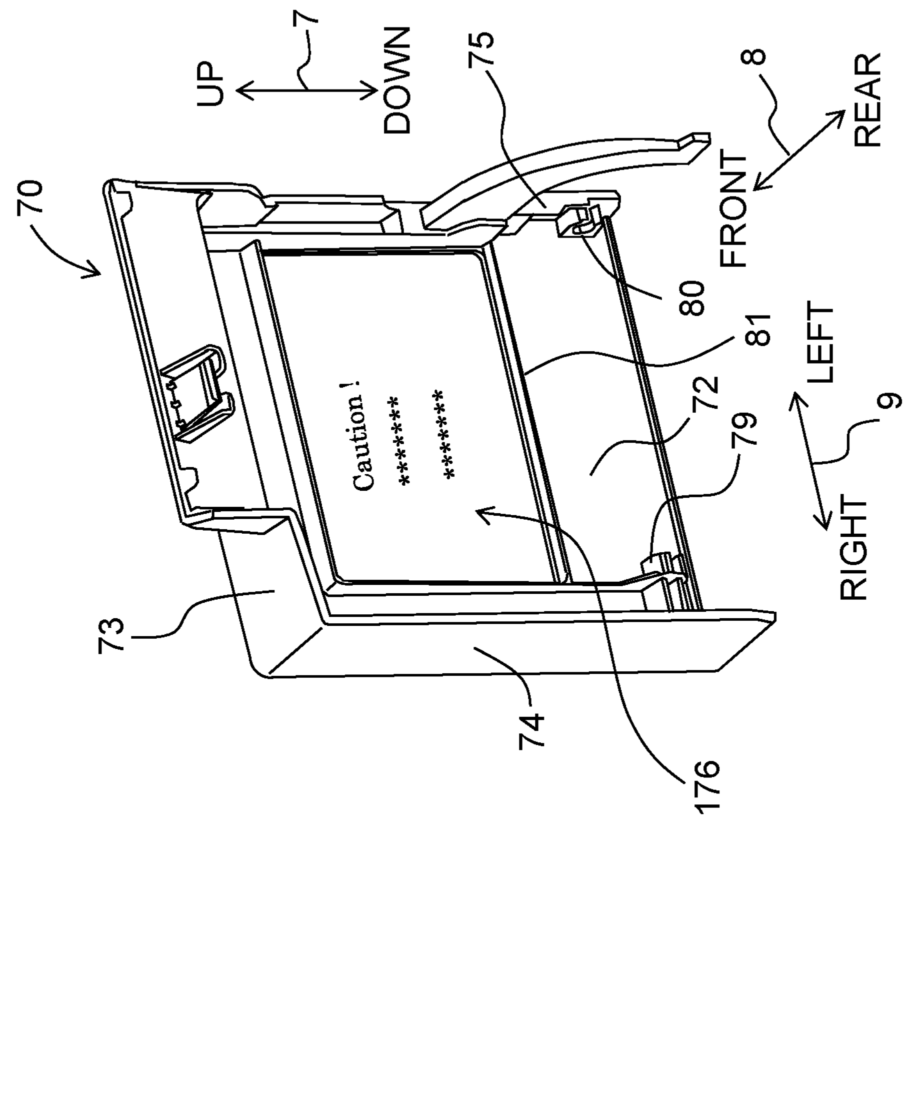
FIG. 9 is a perspective view of an alternative embodiment of the cover 70.

Furthermore, in the embodiment, the explanation has been given about the transparent window 76 as an example of the transmitting section. However, the specific example of the transmitting section is not limited to this. For example, as shown in FIG. 9, a transmitting section according to a modification may be a letter, figure or symbol, etc. 176, drawn in the inner surface of the main wall 72. In the following, the letter, figure, symbol, etc., will be collectively referred to as "letter, etc.". More specifically, the transmitting section may be configured to be visible by the user when the cover 70 is located at the exposure position and may have a procedure for replenishing the ink, a precaution when replenishing the ink, etc. described therein, etc.

Namely, the transmitting section according to the modification is different from the transmitting section of the embodiment in that the transmitting section itself has the information to be transmitted. Further, the transmitting section according to the modification optically transmits, to the user, the information that the transmitting section itself has, under the condition that the cover 70 is located at the exposure position. In other words, the user can see the letter, etc. drawn in the transmitting section by locating the cover 70 according to the modification at the exposure position.

By checking and stopping the ink moving toward the letter, etc. drawn in the main wall 72 by the above-described checking section, it is possible to suppress the lowering in visibility of the letter, etc. Note that the letter, etc., may be expressed by concave/convex portions formed in the inner surface of the main wall 72, or may be drawn in a sticker adhered to the inner surface of the main wall 72.

Further, in the above embodiment, although the explanation has been given about the ink as an example of the liquid, the present teaching is not restricted to this. Namely, instead of the ink, the liquid may be a pretreatment liquid which is to be discharged onto a recording paper before discharging an ink at the time of printing, or may be water, etc. which is to be sprayed in the vicinity of the nozzles 40 of the recording head 39 for preventing drying of the nozzles 40 of the recording head 39. Note that the present teaching is particularly effective by being applied to a liquid consuming apparatus provided with a tank storing a color liquid.

What is claimed is:

1. A liquid consuming apparatus configured to consume liquid, comprising:

a tank including:

a liquid storing chamber configured to store the liquid therein;

a front wall extending in an up-down direction and having a light transmissive property;

an inlet located at a rear-side of the front wall in a front-rear direction orthogonal to the up-down direction; and an upper wall extending toward the rear-side in the front-rear direction beyond the inlet;

a liquid consuming section configured to consume the liquid stored in the liquid storing chamber; and a cover facing the front wall at the front-side of the tank;

wherein the cover further comprises; an inner surface facing the front wall; and outer surface opposite to the inner surface and being exposed to outside; an opening which penetrates through the cover and through which the front wall is visible from the outside; and a checking section disposed on the inner surface along the opening, and wherein the cover does not cover the upper wall of the tank.

2. The liquid consuming apparatus according to claim 1, wherein the checking section is at least provided above the opening.

3. The liquid consuming apparatus according to claim 2, wherein the checking section surrounds a periphery of the opening.

4. The liquid consuming apparatus according to claim 1, wherein the checking section is a rib formed to project from the inner surface of the cover.

5. The liquid consuming apparatus according to claim 4, wherein the rib is formed between the front wall of the tank and the inner surface of the cover.

6. The liquid consuming apparatus according to claim 1, wherein the checking section is a stepped portion formed to project from the inner surface of the cover.

7. The liquid consuming apparatus according to claim 6, wherein the stepped portion is formed between the front wall of the tank and the inner surface of the cover.

8. The liquid consuming apparatus according to claim 1, wherein the checking section is configured to hold the liquid by surface tension.

9. The liquid consuming apparatus according to claim 1, wherein the tank further includes an inclined wall connected to the front wall and to the upper wall, the inclined wall being inclined toward the rear-side with respect to the front wall, and wherein the inlet is located on the inclined wall.

10. The liquid consuming apparatus according to claim 1, wherein the inlet is located on the upper wall.

11. The liquid consuming apparatus according to claim 1, wherein the cover is configured to rotate between a cover position at which the cover covers the front wall and an exposure position at which the cover allows the front wall to be exposed.

* * * * *